United States Patent [19]

Gilden et al.

[11] Patent Number: 4,868,894

[45] Date of Patent: Sep. 19, 1989

[54] SYSTEM FOR TRANSMITTING MICROWAVE SIGNALS VIA AN OPTICAL LINK

[75] Inventors: Meyer Gilden, West Hartford, Conn.; Louis B. Allen, Jr., West Chester, Ohio

[73] Assignee: United Technologies, Hartford, Conn.

[21] Appl. No.: 130,485

[22] Filed: Dec. 9, 1987

[51] Int. Cl.$^4$ .............................................. H04B 9/00
[52] U.S. Cl. ..................................... 455/617; 455/612
[58] Field of Search ............... 455/266, 259, 258, 313, 455/314, 606, 607, 612, 609, 610, 611, 617, 618, 619

[56] References Cited

U.S. PATENT DOCUMENTS

| | | | |
|---|---|---|---|
| 3,050,630 | 8/1962 | Bird | 455/617 |
| 3,403,257 | 9/1968 | Petroff | 250/199 |
| 3,482,099 | 12/1969 | Goodwin | 250/199 |
| 3,571,597 | 10/1969 | Wood et al. | 250/199 |
| 3,654,473 | 4/1972 | Nussmeier | 250/199 |
| 3,752,992 | 8/1973 | Fluhr | 250/199 |
| 3,851,167 | 11/1974 | Levine | 250/199 |
| 4,234,971 | 11/1980 | Lutes et al. | 455/619 |
| 4,249,264 | 2/1981 | Crochet et al. | 455/612 |
| 4,287,606 | 9/1981 | Lutes et al. | 455/617 |
| 4,290,146 | 9/1981 | Adolfsson et al. | 455/612 |
| 4,504,976 | 3/1985 | Beaudet | 455/611 |
| 4,600,303 | 7/1986 | Mogensen | 455/619 |
| 4,750,217 | 6/1988 | Smith | 455/616 |

FOREIGN PATENT DOCUMENTS

| | | | |
|---|---|---|---|
| 56-12143 | 2/1956 | Japan. | |
| 2150383 | 6/1985 | United Kingdom | 455/618 |

OTHER PUBLICATIONS

"Optical Communications", Microwave Journal Magazine, by Dr. Israel Ury, Apr. 1985.

Primary Examiner—Robert L. Griffin
Assistant Examiner—Leslie Van Beek
Attorney, Agent, or Firm—Eric W. Petraske

[57] ABSTRACT

A system for the transmission of signals along an optical carrier employs a technique to extend the effective frequency range of modulation beyond that of which a semiconductor laser is capable by combination of signals at the source to form a composite difference signal and recombination at the receiver to restore the original signal.

9 Claims, 3 Drawing Sheets

SYSTEM FOR TRANSMITTING MICROWAVE SIGNALS VIA AN OPTICAL LINK

TECHNICAL FIELD

The field of the invention is that of transmission of microwave radio frequency signals by modulation of an optical carrier signal.

BACKGROUND ART

It is known to modulate an optical carrier with a signal, using amplitude modulation, frequency modulation, or polarization modulation. U.S. Pat. No. 3,571,597 illustrates a system in which a signal is transmitted via an optical carrier and simultaneously an RF reference signal is also transmitted for the purpose of maintaining phase stabilization between the originating location and the remote location, so that the system is not completely optical. Many systems are known in the prior art that combine a signal with a reference signal, for the purpose of providing a more stable and effective method of transmission. These prior art systems have a common feature in that the signal transmitted has a frequency sufficiently low that it does not cause difficulty in modulating the optical carrier.

DISCLOSURE OF INVENTION

The invention relates to a signal transmission system in which the effective modulation frequency range is extended beyond the modulation capability of the optical source.

A feature of the invention is the subtraction from a modulated RF input signal of a multiple of an RF reference signal so that a difference frequency is formed that has a frequency and bandwidth within the capability of the optical modulator. The difference frequency and the reference frequency are transmitted to a remote location where the reference frequency is multiplied again and the result is added to the difference frequency to reproduce the original signal at the original carrier frequency.

Other features and advantages will be apparent from the specification and claims and from the accompanying drawings which illustrate an embodiment of the invention.

BEST MODE FOR CARRYING OUT THE INVENTION

At present, the optical devices having the highest modulation range are semi-conductor laser diode transmitters, such as an Ortel TLW600S, which have an effective modulation range extending to about 6 gigahertz (GHz). If it is desired to send a microwave signal, which commonly has a frequency in excess of 10 GHz, then straightforward modulation of the optical source as in the prior art is not possible. The instant invention solves this problem by means of a combination of signals to produce the effect of a broader modulation bandwidth.

Figure 1:
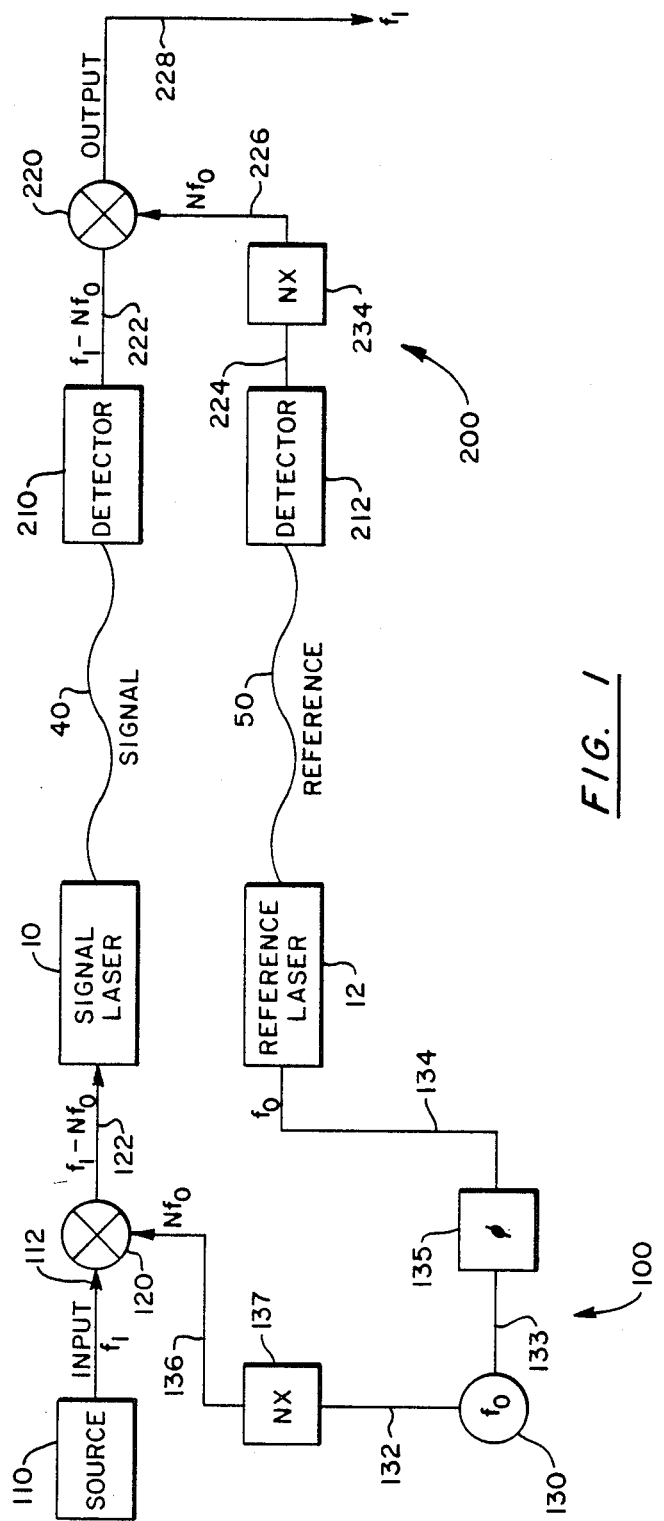
FIG. 1 illustrates an embodiment of the invention having separate optical paths for the information signal and the reference signal.

Referring now to FIG. 1, there is shown a system divided into a first subsystem located at a transmission location denoted by the numeral 100 on the left, which is the source of signals and a second subsystem denoted by the numeral 200 on the right, which is the receiving section in some remote location. Source 110 is a symbolic representation of some other system that generates a modulated microwave frequency that has an RF signal carrier frequency plus signal sidebands that extend outside the frequency range for which laser 10 may be modulated effectively. Line 112, which term refers to a coaxial cable or microwave plumbing as required, carries a modulated RF signal into mixer 120 which is any conventional microwave mixer.

RF source 130 generates a reference microwave signal that is carried on line 132 to a conventional frequency multiplier 137 which multiplies the reference signal by a predetermined factor to produce a reference signal, referred to as an intermediate RF reference signal herein, that is carried on line 136 to mixer 120. Within mixer 120 the two signals combine to form a difference signal, referred to as an RF modulation signal, having the value $f_1 - nf_0$ which is carried on line 122 to laser 10. Conventional filters may be used to suppress the sum signal if desired and are also meant to be represented by the mixer symbol. This signal serves to modulate laser 10 in the conventional manner.

The value of the reference signal and the multiplication factor are selected such that the difference frequency with its greatest expected bandwidth falls within the range which laser 10 can handle. It does not matter if the magnitude of $nf_0$ is greater or less than $f_0$, of course. The difference frequency is applied to the terminal of laser to modulate its optical output. The modulated optical signal, which is impressed on an optical carrier having a wavelength within the range of semi-conductor lasers such as 0.85 microns is carried on optical fiber 40 to the remote location 200 where fiber 40 enters detector 210, an optical detector such as an Ortel PD050-OM with a response out to 7 GHz. The output of this detector is the envelope having the frequency $f_1 - nf_0$ and is carried on line 222 to mixer 220 which is essentially the same as mixer 120.

In a separate channel, the reference signal $f_0$ is carried on line 133 through an optional phase shifter 135 that may be used to impose any desired phase offset on the reference and then through line 134 to a second laser 12. This laser 12 is modulated by the reference signal and transmits the modulated reference signal along optical fiber 50 to a corresponding optical detector 212. The detected reference signal is carried on line 224 to a second frequency multiplier 237 that is essentially the same as multiplier 137. The multiplied signal $nf_0$ is carried by line 226 to mixer 220 where it is combined with the difference signal. The sum signal, having the value of $f_1$, emerges on line 228 to whatever utilization means are relevant.

An advantageous feature of the invention is that, not only is the effective modulation range of the semi-conductor lasers 10 and 12 increased, but also the combination of a difference signal at the input and a sum signal at the output results in the cancellation of the reference signal, so that fluctuations in the reference signal that are long compared with the transit time through the system do not matter. Since the signals will carried on two optical fibers 40 and 50, traveling essentially the same path, influences on the fibers such as heat, stress and the like will usually be the same and will cancel out also.

Those skilled in the art will readily be able to devise alternative embodiments of the invention. For example, the reference source need not be at the transmitting location. If, in a system employing the invention, the transmission location is limited in terms of space or power, the reference source may be placed in the remote location. Also, the reference signal could be cycled around a loop, using the same fiber or a different one, to improve the reference stability. A system using the invention may be a phased array in which each phase shifter 135 in the individual sub-system is controlled to provide the correct differential phase.

Figure 2:
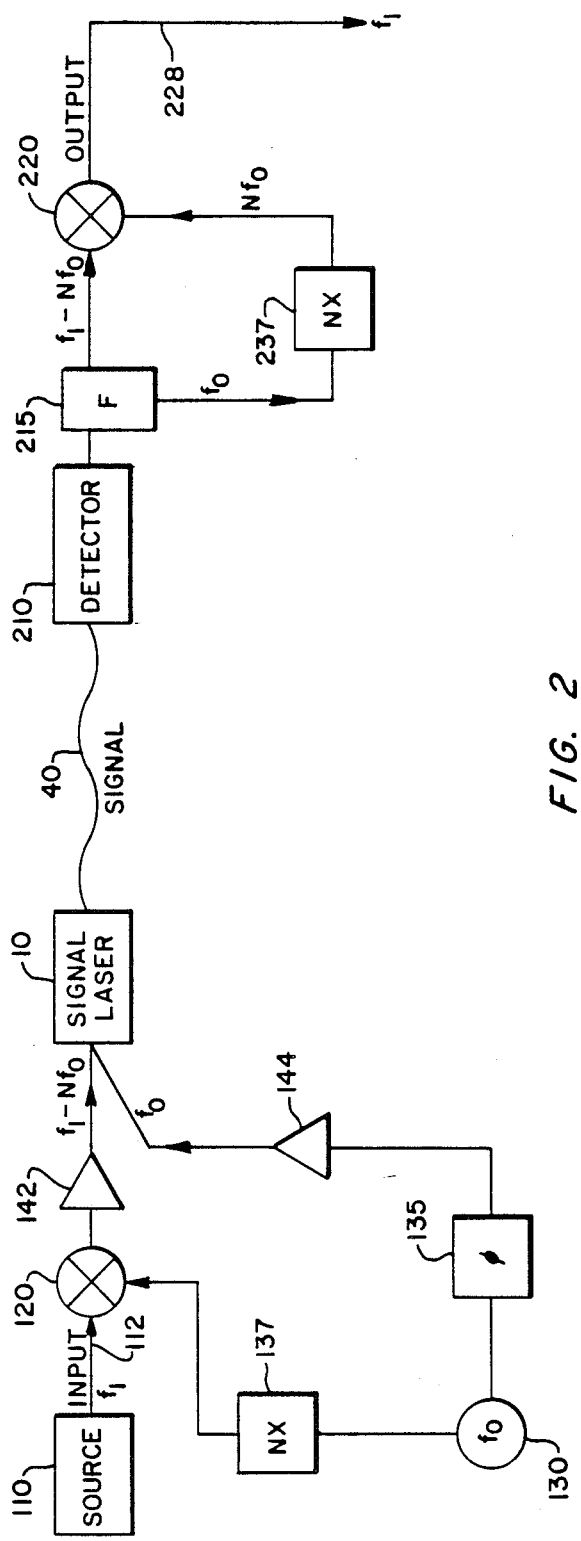
FIG. 2 illustrates an embodiment of the invention in which both signals have a common path.

An alternate embodiment of the invention is shown in FIG. 2, in which the signals are combined as before but two standard commercially available amplifiers 142 and 144, are added for isolation. The outputs of these two amplifiers are combined at a common modulation terminal on laser 10, so that the modulation signal emitting from laser 10 carries both the difference frequency and the reference frequency. A single detector 210 in location 200 demodulates the composite envelope which is separated in filter 215 combining a high pass and a low pass filter. The values of the multiplication, the constant and the reference signal are selected such that there is a clean separation of the difference signal and the reference signal. It does not matter which of the two is the higher and which is the lower. These separated signals are combined as before in mixer 220 to produce the final output signal. This embodiment has the advantage of requiring only a single optical fiber, with the corresponding disadvantage of more complex electronics.

Figure 3:
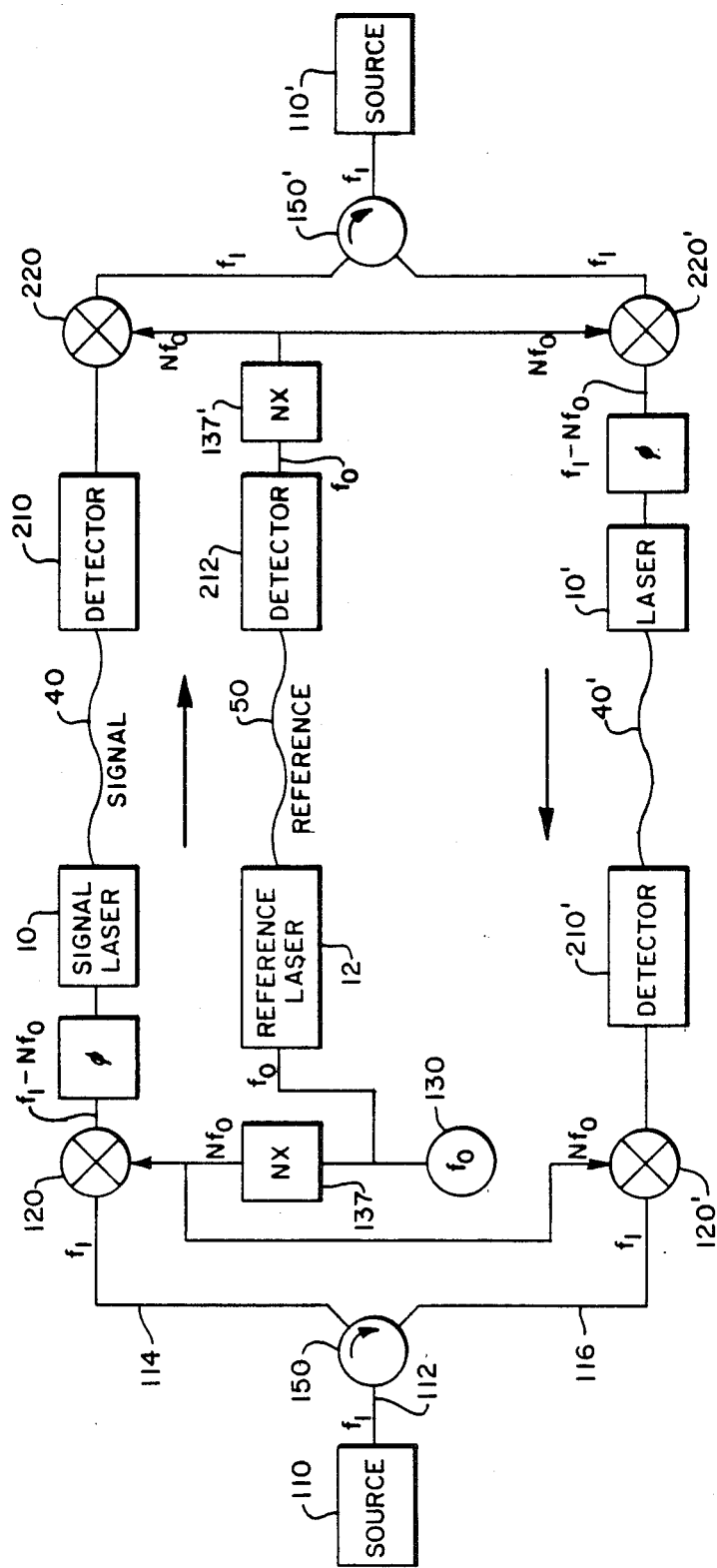
FIG. 3 illustrates an embodiment of the invention having a bi-directional signal transmission.

Referring now to FIG. 3, there is illustrated a system that has a bi-directional link. The basic system of FIG. 1 has added to it a commercially available microwave circulator 150, having two output ports 114 and 116 which are connected to mixers 120 and 120′ respectively. The multiplied reference signal is connected to both mixers 120 and 120′. Mixer 120 is used in a transmission path as before. Mixer 120′ is used in a return path from detector 210′ to add signal $nf_0$ to the incoming composite frequency to form a signal at frequency f1. A single reference signal is transmitted on fiber 50 as before. At location 200, a mixer forms the sum of the difference frequency traveling along fiber 40 and the reference frequency traveling along fiber 50 as before and transmits the output signal with a carrier subfrequency $f_1$ to a second circulator 150′ which transmits the signal to source means 110′ which processes the incoming signal in a conventional manner. Source 110′ is capable of duplex transmission in this embodiment and sends a return signal also at frequency f1 through circulator 150′ to mixer 220′ which forms a difference frequency in the same manner as mixer 120. The difference frequency modulates laser 10, and travels along fiber 40′ to location 100, where it is demoduloted in detector 210′. The difference frequency is then combined additively in mixer 120′ to produce a return signal, also at carrier frequency $f_1$, which goes through port 116 through mixer 150 and back to the original source means 110.

Those skilled in the art will readily be able to form other embodiments, such as the use of a single optical fiber for connecting the bi-directional embodiment, in which the three lasers operate at different frequencies and a grating or other optical separation device is used to separate incoming optical signals. For example, a cw source could be used in conjunction with a separate optical modulator.

It should be understood that the invention is not limited to the particular embodiments shown and described herein, but that various changes and modifications may be made without departing from the spirit and scope of this novel concept as defined by the following claims.

We claim:

1. A system for transmitting data between a transmission location and a remote location in a predetermined RF signal bandwidth centered on a predetermined microwave signal carrier frequency comprising:

reference signal generation means, located at transmission location, for generating an RF reference signal at a predetermined RF reference frequency and means for transmitting to said remote location an optical reference signal modulated with said RF reference signal and means for demodulating said optical reference signal to recreate said RF reference signal at said remote location; and in said transmission location optical source means, having a predetermined optical modulation bandwidth and a maximum modulation frequency, for generating a modulated optical signal based on a predetermined optical carrier frequency;

RF source means for generating a modulated input microwave signal on a microwave carrier having a predetermined microwave signal carrier frequency greater than said maximum modulation frequency and having an RF signal bandwidth within said optical modulation bandwidth;

first frequency multiplication means, connected to said RF reference signal generation means, for multiplying said RF reference signal by a predetermined factor to form an intermediate microwave reference signal in the microwave region;

first microwave mixer means, connected to said first frequency multiplication means and said optical source means, for mixing said intermediate microwave reference signal with said modulated input microwave signal to form an RF modulation input microwave signal to form an RF modulation signal having a modulation signal carrier frequency equal to the difference of the frequency of said modulated input RF signal and the frequency of said intermediate microwave reference signal and less than said maximum modulation frequency, said RF modulation signal having an RF modulation signal bandwidth such that said RF modulation signal and said RF modulation signal bandwidth are within said optical modulation bandwidth, so that said optical source means generates and optical transmission signal modulated with said RF modulation signal;

optical fiber means for transporting said optical transmission signal to said remote location; and in said remote location optical detection means, connected to said optical fiber means, for detecting said RF modulation signal to form a detected RF modulation signal;

second frequency multiplication means, connected to said means for demodulating said optical reference signal to recreate said RF reference signal, for multiplying said RF reference signal to recreate said intermediate microwave reference signal; and second RF mixer means, connected to said detection means and said frequency multiplication means, for adding said detected RF modulation signal and said recreated intermediate microwave reference signal to form an output signal at said microwave signal carrier frequency, whereby said output signal is substantially equivalent to said modulated input microwave signal.

2. A system according to claim 1, in which said optical source means is a first semiconductor laser,
said means for transmitting an optical reference signal includes a second semiconductor laser, a second optical fiber, and a second optical detector connected to said second optical fiber.

3. A system according to claim 1, further including means for transmitting a phase shift signal to said remote location.

4. A system according to claim 1, in which said optical source means includes a signal optical source means connected to said mixer and a reference optical source means connected to said reference signal generation means for generating a second optical carrier modulated with said RF reference signal; and
said detection means includes signal detection means responsive to said optical transmission signal for detecting said modulation signal and second optical detection means, responsive to said second optical carrier, for detecting said RF reference signal.

5. A system for transmitting data between a transmission location and a remote location in a predetermined RF signal bandwidth centered on a predetermined RF signal carrier frequency comprising:
reference signal generation means, located at one of said transmission and remote locations, for generating an RF reference signal at a predetermined RF reference frequency and means for transmitting to the other of said transmission and remote locations an optical reference signal modulated with said RF reference signal and then demodulating said optical reference signal to recreate said RF reference signal at said other location; and
in said transmission location
optical source means, having a predetermined optical modulation bandwidth, for generating a modulated optical signal based on a predetermined optical carrier frequency;
RF source means for generating a modulated input RF signal on an RF carrier having a predetermined RF signal carrier frequency and having an RF signal bandwidth within said optical modulation bandwidth;
first frequency multiplication means, connected to said RF reference signal, for multiplying said RF reference signal by a predetermined factor to form an intermediate RF reference signal;
first RF mixer means, connected to said first frequency multiplication means and said optical source means, for mixing said intermediate RF reference signal with said modulated input RF signal to form an RF modulation signal having a modulation signal carrier frequency equal to the difference of the frequency of said modulated input RF signal and the frequency of said intermediate RF reference signal, said RF modulation signal having an RF modulation signal bandwidth such that said RF modulation signal and said RF modulation signal bandwidth are within said optical modulation bandwidth, so that said optical source means generates an optical transmission signal modulated with said RF modulation signal;
optical fiber means for transporting said optical transmission signal to said remote location; and
in said remote location
optical detection means, connected to said optical fiber means, for detecting said RF modulation signal to form a detected RF modulation signal;
second frequency multiplication means, connected to said RF reference signal, for multiplying said RF reference signal to recreate said intermediate RF reference signal; and
second RF mixer means, connected to said detection means and said frequency multiplication means, for adding said detected RF modulation signal and said recreated intermediate RF reference signal to form an output signal at said RF signal carrier frequency, whereby said output signal is substantially equivalent to said modulated input RF signal;
in which system said RF modulation signal and said RF reference signal are applied through electrical isolation means to said optical source means, whereby said optical source means generates a composite optical signal containing both said RF reference signal and said RF modulation signal; and high pass and low pass RF filters are connected to said optical detection means to pass said RF modulation signal and said RF reference signal to separate inputs on said second mixer.

6. A system for biodirectional transmission of data between a transmission location and a remote location in a predetermined RF signal bandwidth centered on a predetermined RF signal carrier frequency comprising;
reference signal generation means, located at one of said transmission and remote locations, for generating an RF reference signal at a predetermined RF reference frequency and means for transmitting to the other of said transmission and remote locations an optical reference signal modulated with said RF reference signal and then demodulating said optical reference signal to recreate said RF reference signal at said other location; and
in said transmission location
optical source means, having a predetermined optical modulation bandwidth, for generating a modulated optical signal based on a predetermined optical carrier frequency;
RF source means for generation a modulated input RF signal on an RF carrier having a predetermined RF signal carrier frequency and having an RF signal bandwidth within said optical modulation bandwidth;
first frequency multiplication means, connected to said RF reference signal, for multiplying said RF reference signal by a predetermined factor to form an intermediate RF reference signal;
first RF mixer means, connected to said first frequency multiplication means and said optical source means, for mixing said intermediate RF reference signal with said modulated input RF signal to form an RF modulation signal having a modulation signal carrier frequency equal to the difference of the frequency of said modulated input RF signal and the frequency of said intermediate RF reference signal, said RF modulation signal having an RF modulation signal bandwidth such that said RF modulation signal and said RF modulation signal bandwidth are within said optical modulation bandwidth, so that said optical source means generates an optical transmission signal modulated with said RF modulation signal;

optical fiber means for transporting said optical transmission signal to said remote location; and in said remote location optical detection means, connected to said optical fiber means, for detecting said RF modulation signal to form a detected RF modulation signal;

second frequency multiplication means, connected to said RF reference signal, for multiplying said RF reference signal to recreate said intermediate RF reference signal; and second RF mixer means, connected to said detection means and said frequency multiplication means, for adding said detected RF modulation signal and said recreated intermediate RF reference signal to form an output signal at said RF signal carrier frequency, whereby said output signal is substantially equivalent to said modulated input RF signal;

further including, at said transmission location, second detection means, third RF mixer means connected to said second detection means and to said first frequency multiplication means and a first microwave circulator connected between said first and second RF mixer means and said RF source means; and at said remote location, second RF source means, second optical source means connected to said second detection means by second optical fiber means, fourth RF mixer means, connected to said second optical source means and to said second frequency multiplication means, and a second microwave circulator connected to said second RF mixer means, said second RF source means and to said fourth RF mixer means, whereby said system has the capability for bidirectional transmission of data from said transmission location to said remote location and vice versa.

7. A system for transmitting signals between a transmission location and a remote location in a predetermined signal bandwidth centered on a predetermined signal carrier frequency comprising:

in said transmission location optical source means, having a predetermined optical modulation bandwidth, for generating a modulated optical signal based on a predetermined optical carrier frequency;

RF source means for generating a modulated RF signal having a signal bandwidth within said modulation bandwidth;

reference signal generation means for generating an RF reference signal having a frequency less than said signal carrier frequency;

first frequency multiplication means connected to said reference signal generation means for multiplying said RF reference signal to form an intermediate RF signal that is the closest integral multiple to said RF signal carrier frequency of said RF reference signal;

first RF mixer means connected to said frequency multiplication means and said source means for mixing said intermediate signal with said modulated RF signal to form an RF modulation signal having a modulation signal frequency equal to the difference of the frequency of said modulated RF signal and the frequency of said intermediate RF signal and having an RF modulation signal bandwidth such that said RF modulation signal and said RF modulation signal bandwidth are within said optical modulation bandwidth, said RF mixer means having an output connected to said optical source means so that said optical source means generates an optical transmission signal modulated with said RF modulation signal;

means for transporting said optical transmission signal and said RF reference signal to a remote location; and in said remote location detection means, for detecting said RF reference signal and said RF modulation signal to form a detected RF reference signal and a detected RF modulation signal;

second frequency multiplication means, responsive to said detected RF reference signal, for multiplying said detected RF reference signal to recreate said closest integral multiple signal; and second RF mixer means, connected to said detection means and said frequency multiplication means, for adding said detected RF modulation signal and said recreated closest integral multiple signal to form an output signal.

8. A system for transmitting data between a transmission location and a remote location in a predetermined RF signal bandwidth centered on a predetermined RF signal carrier frequency comprising;

reference signal generation means, located at one of said transmission and remote locations, for generating an RF reference signal at a predetermined RF reference frequency and means for transmitting to the other of said transmission and remote locations an optical reference signal modulated with said RF reference signal and then demodulating said optical reference signal to recreate said RF reference signal at said other location; and in said transmission location optical source means, having a predetermined optical modulation bandwidth, for generating a modulated optical signal based on a predetermined optical carrier frequency;

RF source means for generation a modulated input RF signal on an RF carrier having a predetermined RF signal carrier frequency and having an RF signal bandwidth within said optical modulation bandwidth;

first frequency multiplication means, connected to said RF reference signal, for multiplying said RF reference signal by a predetermined factor to form an intermediate RF reference signal;

first RF mixer means, connected to said first frequency multiplication means and said optical source means, for mixing said intermediate RF reference signal with said modulated input RF signal to form an RF modulation signal having a modulation signal carrier frequency equal to the difference of the frequency of said modulated input RF signal and the frequency of said intermediate RF reference signal, said RF modulation signal having an RF modulation signal bandwidth such that said RF modulation signal and said RF modulation signal bandwidth are within said optical modulation bandwidth, so that said optical source means generates an optical transmission signal modulated with said RF modulation signal;

optical fiber means for transporting said optical transmission signal to said remote location; and in said remote location optical detection means, connected to said optical fiber means, for detecting said RF modulation signal to form a detected RF modulation signal;

second frequency multiplication means, connected to said RF reference signal, for multiplying said RF reference signal to recreate said intermediate RF reference signal; and second RF mixer means, connected to said detection means and said frequency multiplication means, for adding said detected RF modulation signal and said recreated intermediate RF reference signal to form an output signal at said RF signal carrier frequency, whereby said output signal is substantially equivalent to said modulated input RF signal;

in which said mixer and said reference signal generation means are each connected to a corresponding isolation amplifier, each of which is connected to said optical source means, whereby said optical source means generates said optical transmission signal modulated with both said modulation signal and said RF reference signal; and said detection means includes means for separating a detected compositor signal into said detected RF reference signal and said detected modulation signal, whereby said RF reference signal and said modulation signal share a common transmission channel.

9. A system for transmitting data between a transmission location and a remote location in a predetermined RF signal bandwidth centered on a predetermined microwave signal carrier frequency comprising;

reference signal generation means, located at said remote location, for generating an RF reference signal at a predetermined RF reference frequency and means for transmitting to the said transmission location an optical reference signal modulated with said RF reference signal and means for demodulating said optical reference signal to recreate said RF reference signal at said transmission location; and in said transmission location optical source means, having a predetermined optical modulation bandwidth, and a maximum modulation frequency, for generating a modulated optical signal based on a predetermined optical carrier frequency;

RF source means for generation a modulated input microwave signal on an microwave carrier having a predetermined microwave signal carrier frequency greater than said maximum modulation frequency and having an RF signal bandwidth within said optical modulation bandwidth;

first frequency multiplication means, connected to said means for demodulating said optical reference signal to recreate said RF reference signal, for multiplying said RF reference signal by a predetermined factor to form an intermediate microwave reference signal in the microwave region;

first microwave mixer means, connected to said first frequency multiplication means and said optical source means, for mixing said intermediate microwave reference signal with said modulated input microwave signal to form an RF modulation signal having a modulation signal carrier frequency equal to the difference of the frequency of said modulated input RF signal and the frequency of said intermediate microwave reference signal and less than said maximum modulation frequency, said RF modulation signal having an RF modulation signal bandwidth such that said RF modulation signal and said RF modulation signal bandwidth are within said optical modulation bandwidth, so that said optical source means generates an optical transmission signal modulated with said RF modulation signal;

optical fiber means for transporting said optical transmission signal to said remote location; and in said remote location optical detection means, connected to said optical fiber means, for detecting said RF modulation signal to form a detected RF modulation signal;

second frequency multiplication means, connected to said RF reference signal, for multiplying said RF reference signal to recreate said intermediate microwave reference signal; and second RF mixer means, connected to said detection means and said frequency multiplication means, for adding said detected RF modulation signal and said recreated intermediate microwave reference signal to form an output signal at said microwave signal carrier frequency, whereby said output signal is substantially equivalent to said modulated input microwave signal.

* * * * *